United States Patent [19]

Hudock

[11] 4,235,259
[45] Nov. 25, 1980

[54] FITTING REPLACEMENT METHOD

[76] Inventor: David L. Hudock, 435 Washington Ave., Egg Harbor City, N.J. 08215

[21] Appl. No.: 967,624

[22] Filed: Dec. 8, 1978

[51] Int. Cl.$^3$ .............................................. F16L 55/18
[52] U.S. Cl. ...................................... 138/97; 285/15; 264/36
[58] Field of Search .................... 138/97; 285/15, 156, 285/417; 264/36

[56] References Cited

U.S. PATENT DOCUMENTS

| | | | |
|---|---|---|---|
| 796,781 | 8/1905 | Welsh | 138/97 |
| 1,770,852 | 7/1930 | Hill | 285/156 X |
| 1,996,346 | 4/1935 | Mueller | 285/417 X |
| 2,449,803 | 9/1948 | Collison | 137/599.1 |
| 3,826,521 | 7/1974 | Wilhelmsen | 285/15 |
| 3,837,685 | 9/1974 | Miller | 138/97 X |
| 3,850,459 | 11/1974 | Blumenkranz et al. | 285/417 X |
| 3,857,588 | 12/1974 | Curtin | 285/31 |
| 3,971,574 | 7/1976 | Curtin | 285/31 |
| 3,976,314 | 8/1976 | Graham | 285/417 X |
| 4,013,309 | 3/1977 | Quick | 285/31 |

FOREIGN PATENT DOCUMENTS 2500735  7/1976  Fed. Rep. of Germany ............. 138/97

*Primary Examiner*—James E. Bryant, III
*Attorney, Agent, or Firm*—Fay & Sharpe

[57] ABSTRACT

A method and article for replacing a fitting included in a fluid system comprised of plastic conduit lengths and fittings with the ends of the conduit lengths received in and cemented to associated fitting branches. When a leak is detected in a fitting or it is otherwise desired to replace the fitting, it is removed from the system by cutting the associated or connecting conduit lengths therefrom generally flush with the fitting branch outermost ends. A replacement fitting having branches geometrically compatible with the original fitting branches and branch lengths greater than those of the original fitting is then placed in the system to receive the ends of the associated conduit lengths. Because the replacement fitting branches have greater lengths than the original fitting branches, they compensate for the shortened conduit lengths caused by the severing or cutting type removal of the original fitting from the system. Conventional cementing techniques are used to rigidly affix the associated conduit lengths in the replacement fitting branches. Internal locating rings or shoulders may be included in the replacement fitting branches for purposes of locating the associated conduit lengths in the same spacial relationship with each other as they were when connected to the original fitting.

1 Claim, 7 Drawing Figures

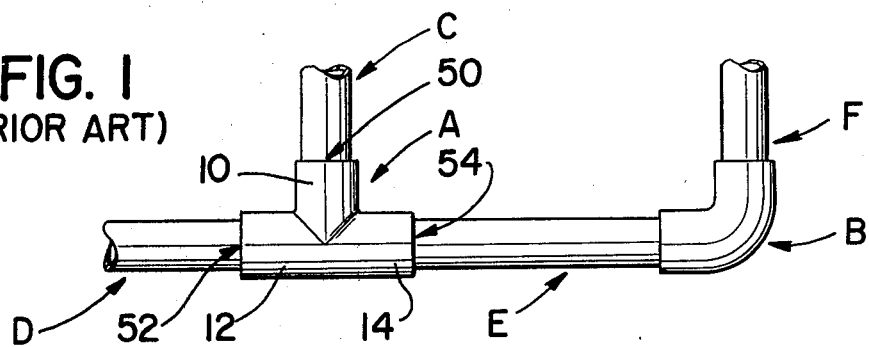
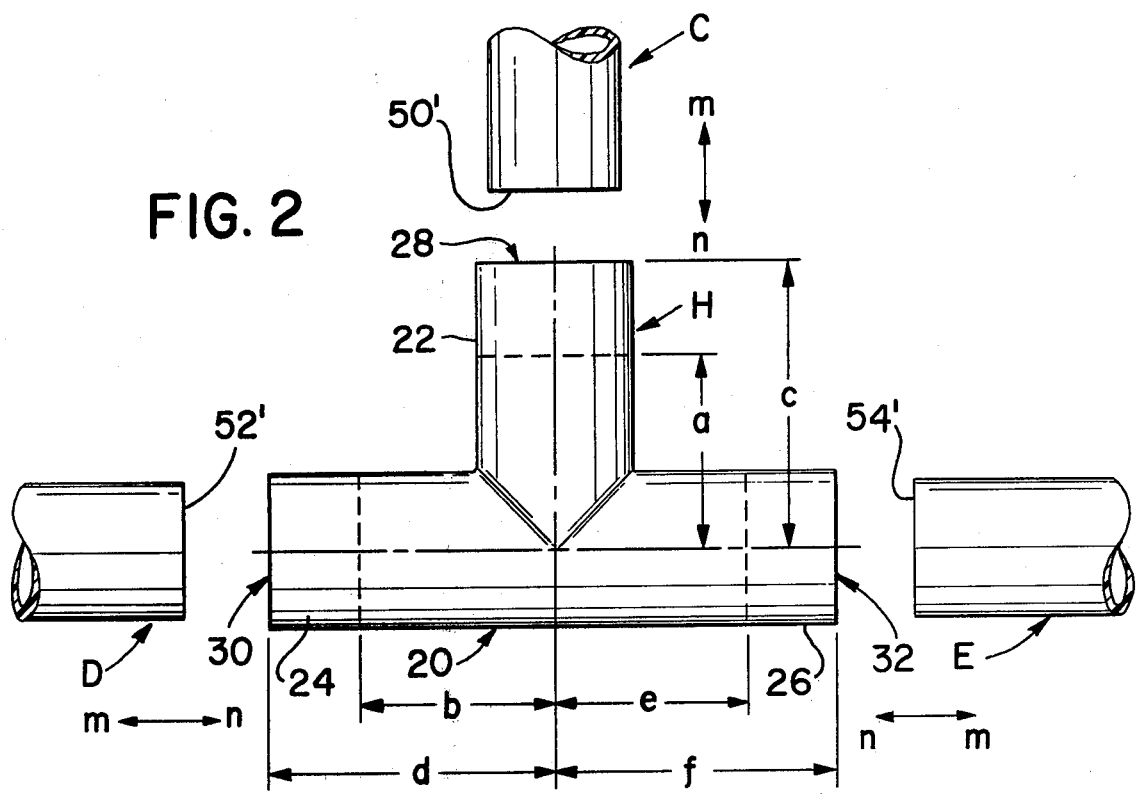
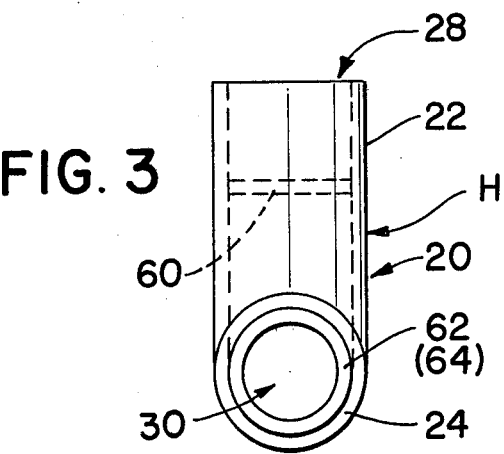

U.S. Patent    Nov. 25, 1980    Sheet 2 of 2    4,235,259
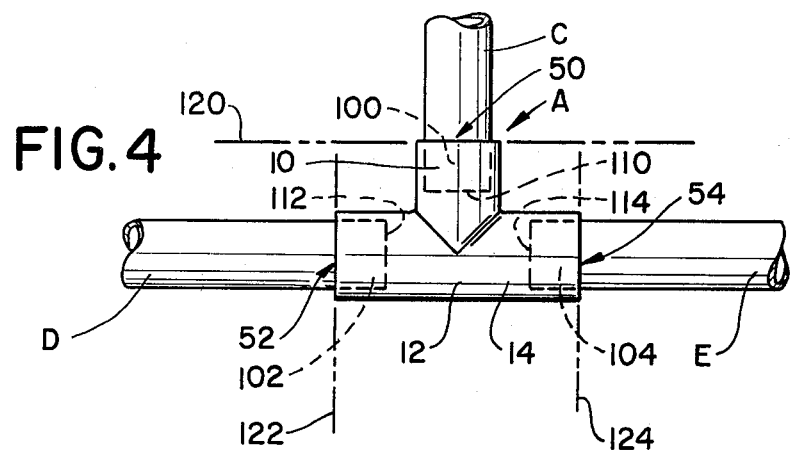
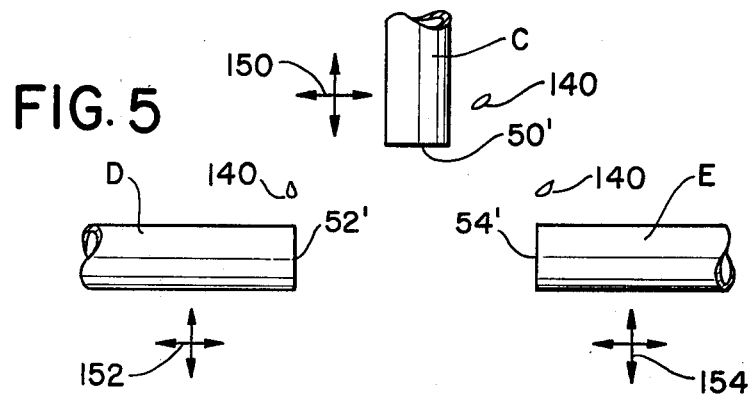
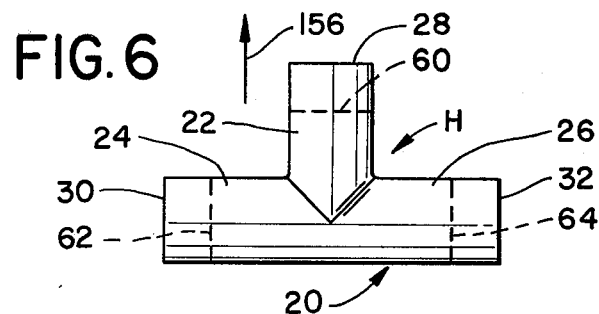
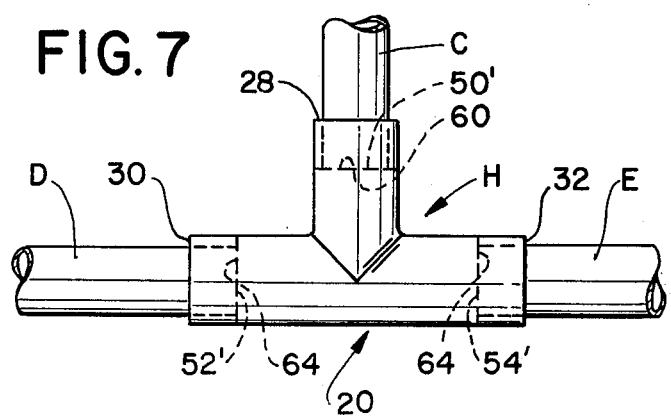

FITTING REPLACEMENT METHOD

BACKGROUND OF THE INVENTION

This invention pertains to the art of fluid handling apparatus and more particularly to fittings employed in fluid lines, systems and the like.

The invention is particularly applicable to a method and article used in conjunction with repairing leaks at fitting areas in fluid lines and systems where the various components are constructed from plastic and will be described with particular reference thereto. However, it will be appreciated by those skilled in the art that the invention has broader applications and may be used for alternative applications in various other environments.

Shaped structures including pipe or tubing and associated fittings constructed of polymeric materials such as polyethylene, polyvinylchloride and the like have become widely known and are now used for many diverse purposes. Typical of such uses are in conveying liquids from one location to another. Piping or fluid systems constructed of polymeric materials have been found to be desirable in view of the ease with which the systems may be fabricated. For example, the fittings and pipes or tubes may be easily assembled by utilizing chemical solvents, adhesives or heating treatments in manners already known in the art. Use of these plastic systems is now employed to some substantial degree in housing and building construction for the requisite water supply and drain lines and sanitary lines. Indeed, and because of the ease of assembly and reduced costs, such constructions have replaced prior metallic pipe and tube constructions to a great extent.

A serious and difficult problem with plastic piping systems arises when a fluid leak occurs at the area of one of the plastic fittings such as, at a tee, elbow, cross, reducer or the like. Since the plastic pipe or conduits are typically permanently affixed to the fittings by means of the aforementioned chemical solvents, adhesives or heating treatments, it has been difficult to replace an individual fitting since the fitting must be cut or severed from the system and replaced with a new fitting. Such cutting, however, reduces the lengths of the original pipe or conduits at the area of the fitting and thereby requires that still other portions of the piping or fluid system be similarly replaced. This necessity undesirably increases the basic costs for effecting repair at a leaking or faulty fitting.

There have been some prior efforts to provide means for repairing ruptures or leaks in plastic pipe or conduit itself without having to remove substantial portions thereof. However, such prior methods and devices have not really focused on the problems encountered when a fluid leak occurs at a fitting area. In addition, prior repair kits or replacement units for repairing pipe or conduit ruptures have necessarily required plural cooperative components which must themselves be moved, adjusted and rigidly affixed to the system. Usually, these repair kits or replacement sections included telescoping components designed to collapse or telescope for allowing the section to extend over adjacent ends of the original conduit lengths without the need for moving or bending the conduit lengths themselves. Such prior arrangements have not proved entirely satisfactory in view of the fact that they include a plurality of components which must be properly positioned and then sealed or otherwise fixedly secured to each other to prevent fluid leakage thereat. As a result, the potential for further fluid leakage is not only still present but, to some extent, is increased. Moreover, the potential for additional leakage is further increased when one end of these prior repair kits or replacement devices directly communicated with a fluid fitting such as a tee, elbow, reducer or the like.

It has, therefore, been desired to devise a method and article which would facilitate easy and simple replacement of fittings disposed in piping or fluid systems of a type where the components are constructed from plastic. The subject invention overcomes the aforementioned problems and others to meet such needs and provides a new and improved method and article for replacing fluid fittings which are simple, economical, require no separate telescoping or adjustable members, are readily adaptable to use with any fitting in a piping or fluid system constructed of plastic components and which are further readily adapted to use in a plurality of other environments and applications.

BRIEF DESCRIPTION OF THE INVENTION

In accordance with the present invention, there is provided a method for replacing a first fitting which couples at least two adjacent pipes or conduits in fluid communication with each other. The first fitting includes at least first and second branches terminating in open outer ends and dimensioned to be placed in close engagement with the terminal end area of an associated one of the conduits and with the conduits affixed to the fitting branches. The method comprises the steps of:

(a) cutting the conduits from connection with the first fitting at a position at least immediately adjacent the outer ends of the first fitting branches and then removing the first fitting from association with the conduits;

(b) providing a second fitting having at least first and second branches terminating in open outer ends and geometrically compatible with the first fitting first and second branches;

(c) dimensioning the second fitting first and second branches to have lengths greater than the first fitting first and second branches and to be placed in close engagement with the end of an associated one of the conduits;

(d) placing the second fitting in association with the at least two conduits at the areas thereof previously occupied by the first fitting; and, (e) rigidly moving the conduits into engagement with the associated of the second fitting first and second branches in fluid communication with each other.

In accordance with another aspect of the present invention, the step of moving includes automatically aligning the at least a pair of conduits in the associated second fitting first and second branches such that points along one of the conduits are spaced apart from points along the other of the conduits in approximately the same spacial relationship as when the conduits were affixed to the first fitting.

According to another aspect of the present invention, the step of cutting is performed substantially flush with the outermost end of the first fitting branches and further includes the step of rigidly affixing the conduits to the second fitting branches in conjunction with the step of moving.

According to a further aspect of the present invention, there is provided a replacement fitting which allows selective replacement of a fluid lead in a first fitting disposed in a fluid system. The first fitting includes at least a pair of fluid conduits coupled thereto in fluid communication with each other by having the pair of conduits affixed in physical engagement with the open outer ends of at least first and second first fitting branches having lengths a and b, respectively. The replacement fitting includes a fitting body having at least first and second branches extending outwardly thereof geometrically compatiable with the first fitting first and second branches. The replacement fitting first and second branches have lengths c and d which are greater than first fitting branch lengths a and b, respectively. The replacement fitting also includes means for placing the first and second branches thereof in physical engagement with the first and second conduits in the same manner as with the first fitting.

In accordance with another aspect of the present invention, the replacement fitting further includes means for locating the first and second conduits in physical engagement with the associated one of the replacement fitting first and second branches such that points along one conduit may be spaced from points along the other conduit in approximately the same spacial relationship as with the first fitting.

The principal object of the present invention is the provision of a fitting replacement method and article for fittings disposed in a piping or fluid system.

Another object of the present invention is the provision of a fitting replacement method and article which are inexpensive to manufacture and use.

Another object of the present invention is the provision of a fitting replacement method and article which do not require separate telescoping sleeves or collars as a part thereof.

Still another object of the present invention is the provision of a fitting replacement method and article which may be utilized on a wide variety of fitting designs and configurations.

Still a further object of the present invention is the provision of a fitting replacement method and article which are readily adaptable to use in a number of different environments and applications.

Still other objects and benefits derived from the concepts of the subject invention will be readily appreciated by those skilled in the art upon a reading and understanding of the following specification.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 1 shows a portion of a piping or fluid system constructed from plastic pipe or conduit and plastic fittings;

FIG. 2 is a tee type fitting which incorporates the concepts of the subject invention thereinto;

FIG. 3 is an end view of the fitting in FIG. 2 showing the conduit locating means; and, FIGS. 4-7 show the sequential steps of removing a standard fitting from a fluid system and replacing same with a replacement fitting.

DESCRIPTION OF THE PREFERRED EMBODIMENT

Referring now to the drawings wherein the showings are for purposes of illustrating a preferred embodiment of the invention only and not for purposes of limiting same, FIG. 1 shows a portion of a piping or fluid system comprised of a tee type fitting A, an elbow type fitting B and a plurality of fluid pipes or conduits C, D, E and F which connect fittings A and B or extend outwardly thereof for purposes of interconnecting them with other components (not shown) of the overall fluid system. While only tee and elbow type fittings are shown, the subject invention is equally applicable to other types of fittings such as crosses, reducers, splices and the like.

The fittings and pipes or conduits shown in FIG. 1 are constructed from plastic such as rigid PVC (polyvinylchloride). Other plastic materials such as polyethylene or the like may also be advantageously employed without in any way departing from the overall intent or scope of the present invention. Conduit or pipe lengths C, D, E and F typically comprise what may generally be considered to be thin walled conduit or pipe with the terminal ends of these lengths closely slidably received into the open outer ends of the branches included with fittings A and B. The inner peripheral wall of the fitting branches may taper slightly as is known in order to increase the close fitting relationship with the associated conduit as the conduit is moved axially thereinto. During assembly of a fluid system or pipeline utilizing these various components, a suitable cement or solvent is utilized to fixedly and permanently retain the terminal ends of the conduit lengths in the associated branches of the fittings as is also known in the art. In FIG. 1, the branches of the typical tee type fitting A are generally designated 10, 12 and 14.

FIG. 2 shows a tee type fitting generally designated H which is designed to act as a replacement for fitting A in the event it ruptures or a fluid leak otherwise developes therein. It will be appreciated that the structure and procedural steps described hereinafter with reference to this replacement tee type fitting are equally applicable to other types of fittings such as those noted above. Fitting H includes a fitting body generally designated 20 having branches 22, 24 and 26 which are geometrically compatible with branches 10, 12 and 14 of fitting A. Each branch of fitting body 20 has an open outer end as is generally designated at 28, 30, 32, respectively. These open ends are dimensioned to closely slidably receive conduit or pipe lengths C, D and E in the same manner as described hereinabove with reference to FIG. 1. The fitting is molded from plastic the same or compatible with the plastic construction of tee type fitting A. Again, however, other materials could also be advantageously employed without in any way departing from the intent or scope of the present invention.

As shown in FIG. 2, and as measured from the center of fitting body 20, the lengths of branches 22, 24 and 26 are somewhat longer than corresponding branches 10, 12 and 14 of fitting A shown in FIG. 1. More particularly, the length of branches 10, 12 and 14 of tee fitting A shown superimposed on the body of fitting H in FIG. 2 and generally designated a, b and e, respectively. This increase in branch length facilitates easy and reliable replacement of fitting A in the pipeline or fluid system as will be described hereinafter. By way of example only, and for a conventional or standard ¾" tee such as tee type fitting A, the lengths a, b and e of branches 10, 12 and 14 may be approximately 19/16" whereas the lengths of c, d and f of branches 22, 24 and 26 in replacement fitting H may be approximately 25/8". The difference in branch length dimensions between the original and replacement fittings may be varied for fittings designed to accommodate larger or smaller diameter conduits or to accommodate specific applications. Such changes or modifications in no way affect the overall intent or scope of the present invention.

With reference to both FIGS. 1 and 2, description will hereinafter be made to replacing tee type fitting A in a fluid system by the compatible replacement tee type fitting H. First, and since conduits or pipe lengths C, D and E are rigidly and permanently affixed to fitting A, it is necessary to cut the fitting from the overall fluid system. To that end, the conduits are cut as at areas designated 50, 52 and 54 in FIG. 1, i.e., substantially flush with the outermost ends of fitting branches 10, 12 and 14. Since, in the preferred construction the conduits and fittings are constructed from plastic, this cutting may be easily effected by means of a conventional saw or cutting tool. Once cut, fitting A may be removed from the system. Since conduits C, D and E each have a terminal end portion received in a branch of fitting A, the overall lengths of the conduits will be slightly reduced by an amount equal to that portion of the conduits received inside the fitting as measured from original conduit terminal ends to the area of cuts 50, 52 and 54.

Following the steps of cutting and removing and with reference to FIG. 2, the cut areas define new terminal ends 50', 52' and 54' for conduits C, D and E. These ends may be deburred or otherwise cleaned in preparation for installation into the branches of fitting H. Since branches 22, 24 and 26 of fitting H are greater in length than branches 10, 12 and 14 of the original fitting A, it is necessary to slightly move conduits C, D and E either one at a time or simultaneously in directions m as shown in the FIGURE. This then allows each fitting branch to be aligned with the associated conduit and the conduit thereafter moved in direction n to be closely received in the open outer end 28, 30 and 32 of the associated one of branches 22, 24 and 26. At such insertion, the conduits are rigidly affixed to the fitting as by means of cement, solvent or the like as was effected for the original installation of fitting A. This then will complete replacement of the original tee fitting in order to eliminate the fluid leak problem.

Plastic conduit or pipe of the type involved in the preferred embodiment is oftentimes somewhat brittle and can have a tendency to rupture if subjected to undue distortional forces. Such forces may be applied to the system if conduits C, D and E are not, when received in fitting H, substantially realigned with their original positions in communication with fitting A. If the conduits are received into branches 22, 24 and 26 an amount either greater or lesser than the original positioning, undesired stresses can be applied to other of the components in the overall system. Again, such stresses can ultimately cause ruptures in such other fittings and/or conduits.

To aid in eliminating such problems and to properly position the conduits in the branches of fitting H, the structural arrangement shown in FIG. 3 may be advantageously employed. In FIG. 3, locating rings generally designated 60, 62 and 64 are received inside branches 22, 24 and 26 of the fitting body. These locating rings are received inwardly from open outer ends 28, 30 and 32 a distance such that when terminal ends 50', 52' and 54' of conduits C, D and E are received in branches 22, 24 and 26, the conduits will be positioned at approximately the same position as they were with respect to original tee type fitting A. Accordingly, locating rings 60, 62 and 64 are disposed inwardly from branch open outer ends 28, 30 and 32 a distance such that they are located from the center of fitting body 20 by distances approximately equal to a, b and e, that is, the lengths of branches 10, 12 and 14 or original tee type fitting A. Thus, when fitting H is inserted into the fluid system, conduits C, D and E may be inserted into branches 22, 24, 26 until they positively engage locating rings 60, 62 and 64, respectively, for positively positioning the conduits at substantially their original positions.

The locating rings may be formed integrally with fitting body 20 or may be added thereto following molding. Moreover, and in place of a ring type configuration, other types of locating protrusions or shoulders could be advantageously employed. The use and manner of manufacture of such alternative protrusion or shoulder constructions do not in any way depart from the overall intent or scope of the present invention. In FIG. 3, and with reference to open outer end 30 of branch 24 and its locating ring 62, the rings themselves are dimensioned to have an internal diameter no less than the internal diameter of the associated conduit or pipe length C. The reason for this is to eliminate any undesired end effect at the locating ring area which could otherwise reduce the amount of fluid flow obtainable through the fitting.

While the subject new leak repair method and article have been described with reference to a replacement tee type fitting H for original tee type fitting A in a fluid system, it will be readily appreciated that the overall inventive concepts are equally applicable to other types of system fittings. Typical of these other fittings are the elbow B shown in FIG. 1, crosses, reducers, splices and the like. Adaptation of the concepts to such other types of fittings in no way departs from the overall intent or scope of the present invention. In addition, and while the method and article have been specifically described with reference to conduits having the same diameter, it should be readily appreciated that the invention is applicable to systems utilizing fittings or couplers which accommodate conduits or pipe lengths of different diameters, physical characteristics and the like. Further, the inventive concepts are deemed applicable to many different types of fluid systems. For example, and while the pipeline or fluid system shown in FIG. 1 would be typically found in building constructions, the general concepts involved could be advantageously employed in underground liquid supply or drainage systems and in other systems where fluids or liquids are collected and-/or conveyed from one location to another.

FIG. 4 shows a fluid system including the prior art type of one-piece rigid standard tee fitting A of FIG. 1 constructed from synthetic plastic material. As previously described, the fitting includes standard fitting branches 10, 12 and 14 which terminate at standard fitting branch terminal ends 50, 52 and 54, respectively. Pipes or conduits C, D and E have predetermined lengths of terminal end portions 100, 102 and 104 received in standard fitting branches 10, 12 and 14. The pipe terminal end portions are permanently affixed in the associated fitting branch as by bonding with solvent or adhesive.

In the event of a leak in the area of fitting A or at the joints formed between the fitting and pipes, the fitting cannot be removed and additional adhesive or solvent cannot be forced into the joints. Thus, the fitting itself must be removed. In previous arrangements, pipes C, D and E were cut off well away from the branch ends 50, 52 and 54. In the case of tee type fitting A, standard couplings and additional lengths of pipe were used to provide new pipe ends in the same location as pipe ends 110, 112 and 114 in FIG. 4 so that a new standard tee could be installed in the fluid system.

In accordance with the present application, replacement of standard fitting A is carried out by cutting off pipes C, D and E, as indicated by phantom lines 120, 122 and 124, adjacent standard fitting branch terminal ends 50, 52 and 54. Thus, the predetermined lengths of terminal end portions 100, 102 and 104 of pipes C, D and E within coupling A are severed.

After removal of coupling A and the severed terminal end portions 100, 102 and 104 of pipes C, D and E from the fluid system, pipes C, D and E appear as shown in FIG. 5 with new terminal ends 50', 52' and 54'. These new terminal ends are spaced-apart relative to each other by distances greater than the spacing between ends 110, 112 and 114 (FIG. 4) by an amount equal to the predetermined lengths of severed pipe end portions 100, 102 and 104.

The one-piece rigid replacement fitting H as described above with reference to FIGS. 2 and 3 is constructed of synthetic plastic material and is geometrically similar to standard fitting A. As shown in FIG. 6, the fitting includes branches 22, 24 and 26 which are longer than standard fitting branches 10, 12 and 14 and terminate at terminal ends 28, 30 and 32, respectively. The lengths of replacement fitting branches 22, 24 and 26 are greater than the lengths of standard fitting branches 10, 12 and 14 by amounts approximately equal to the lengths of severed pipe end portions 100, 102 and 104.

The exterior surfaces of the terminal end portions of pipes C, D, E and/or the interior surfaces of replacement fitting branches 22, 24 and 26 are coated with a suitable affixing material. Such material may comprise a solvent or adhesive and is generally indicated by drops 140 in FIG. 5. This coating may be applied in any suitable manner, including wiping or brushing.

Pipes C, D and E are usually manipulatable, as by bending and by movement longitudinally, as generally indicated by arrows 150, 152 and 154 in FIG. 5. Replacement fitting H is movable as indicated by arrow 156 (FIG. 6), and is also tiltable and longitudinally movable so that branches 22, 24 and 26 can receive the end portions of pipes C, D and E until the fitting and pipes are relatively positioned and bonded together in the manner shown in FIG. 7. Because of the dimensional relationships between the branches of standard fitting A (FIG. 4) and the corresponding branches of replacement fitting H (FIG. 6) as described above, the lengths of pipes C, D and E received in the replacement fitting branches are approximately the same length as terminal end portions 100, 102 and 104. However, pipe terminal ends 50', 52' and 54' are spaced apart greater distances then the spacing between ends 110, 112 and 114 by amounts approximately equal to the predetermined lengths of terminal end portions 100, 102 and 104 which were severed at lines 120, 122 and 124 to remove standard fitting A and replace same with replacement fitting H.

As shown in FIG. 6, replacement fitting branches 22, 24 and 26 have internal locating shoulders 60, 62 and 64, respectively. These shoulders are spaced inwardly from replacement fitting branch ends 28, 30 and 32 by a distance approximately equal to the predetermined lengths of terminal end portions 100, 102 and 104 of pipes C, D and E which were severed to remove standard fitting A from the fluid system. When the end portions of pipes C, D and E are inserted into replacement branches 22, 24 and 26, pipe terminal ends 50', 52' and 54' engage these shoulders (FIG. 7) for properly locating the pipe ends so there is no strain on the pipes or other fittings in the fluid system.

The invention has been described with reference to a preferred embodiment. Obviously, modifications and alterations will occur to others upon a reading and understanding of this specification. It is my intention to include all such modifications and alterations insofar as they come within the scope of the appended claims or the equivalents thereof.

Having thus described my invention, I now claim:

1. A method for repairing a fluid leak at a one-piece rigid standard fitting which couples the terminal ends of a plurality of fluid conduits in fluid communication with each other in a fluid system and wherein said fitting includes a plurality of standard fitting branches equal in number to said plurality of fluid conduits and having lengths a and b which terminate in outermost standard fitting branch ends and in which the terminal end areas of said fluid conduits are cooperably received and affixed, said method comprising the steps of:
   (a) severing said fluid conduits from said standard fitting adjacent said outermost standard fitting branch ends and defining new terminal ends on said fluid conduits;
   (b) removing said standard fitting from said system;
   (c) providing a one-piece rigid replacement fitting having a plurality of replacement fitting branches equal in number to said standard branches on said standard fitting and being geometrically compatible with said standard fitting branches and terminating in outermost replacement branch ends;
   (d) dimensioning said replacement fitting branches to have lengths c and d which are greater then lengths a and b, respectively, of the corresponding standard fitting branches and to have a cross-sectional dimension adapted to allow said replacement fitting branches to cooperably receive the new terminal end areas of said fluid conduits;
   (e) applying affixing material to the interior surfaces of said replacement fitting branches and the exterior surfaces of the new terminal end areas of said plurality of conduits for permanently bonding the new terminal end areas of the conduits to the replacement fitting branches when such new terminal end areas are received in such branches;
   (f) moving said new terminal end areas out of their original position relative to each other;
   (g) placing said replacement fitting between said new terminal end areas and in said fluid system with said replacement fitting branches each spaced closely adjacent an associated one of said plurality of fluid conduits;
   (h) moving the new terminal end areas of said plurality of conduits into associated ones of said replacement fitting branches and back to their original positions; and
   (i) providing said replacement fitting branches with internal shoulders spaced from the replacement fitting branch terminal ends by respective distances sufficient to define engagement means for said new terminal ends of said conduits when moved into their reassembled position within said replacement fitting branches.

* * * * *